United States Patent
Nath et al.

(10) Patent No.: US 11,621,767 B2
(45) Date of Patent: Apr. 4, 2023

(54) COORDINATION OF WIRELESS AVIONICS INTRA-COMMUNICATIONS (WAIC) WITH RADIO ALTIMETER SIGNALS

(71) Applicant: ARINC Incorporated, Annapolis, MD (US)

(72) Inventors: Pranay Kanti Nath, Bangalore (IN); Michael A. Lynch, Shelburne, VT (US); Sanjay Bajekal, Simsbury, CT (US); Sivakumar Laguduwa, Thubarahalli (IN); Aswin Kumar Vallamkondu, Bangalore (IN)

(73) Assignee: ARINC Incorporated, Annapolis, MD (US)

( * ) Notice: Subject to any disclaimer, the term of this patent is extended or adjusted under 35 U.S.C. 154(b) by 0 days.

(21) Appl. No.: 17/403,345

(22) Filed: Aug. 16, 2021

(65) Prior Publication Data
US 2022/0060249 A1 Feb. 24, 2022

(30) Foreign Application Priority Data
Aug. 18, 2020 (IN) .............................. 202041035565

(51) Int. Cl.
*H04B 7/185* (2006.01)
*H04W 72/12* (2023.01)
(52) U.S. Cl.
CPC .... *H04B 7/18506* (2013.01); *H04W 72/1226* (2013.01)
(58) Field of Classification Search
CPC .......... H04B 7/18506; H04W 72/1226; H04W 24/08; H04W 72/082
See application file for complete search history.

(56) References Cited

U.S. PATENT DOCUMENTS

| | | |
|---|---|---|
| 7,683,827 B2 | 3/2010 | Kelly, Jr. et al. |
| 8,923,225 B2 | 12/2014 | Sydor et al. |
| 9,755,796 B2 | 9/2017 | Haque et al. |
| 9,867,180 B2 | 1/2018 | Franceschini et al. |

(Continued)

FOREIGN PATENT DOCUMENTS

| | | |
|---|---|---|
| EP | 3182781 A1 | 6/2017 |
| EP | 3316613 A1 | 5/2018 |
| EP | 3651373 A1 | 5/2020 |

OTHER PUBLICATIONS

Extended European Search Report for EP Application No. 21191843.8, dated Jan. 31, 2022, pp. 9.

*Primary Examiner* — Minh Trang T Nguyen
(74) *Attorney, Agent, or Firm* — Kinney & Lange, P. A.

(57) ABSTRACT

A method for coordinating Wireless Avionics Intra-Communication (WAIC) communications with a radio altimeter signal includes monitoring a frequency band and recording a sequence of time stamps, each time stamp of the sequence of time stamps corresponding to a time at which a strength of the radio altimeter signal exceeds a threshold signal strength in the frequency band. The method further includes calculating time stamp intervals between successive time stamps to produce a sequence of time stamp intervals, and identifying a pattern of time stamp intervals in the sequence of time stamp intervals. The method further includes coordinating the WAIC communications with the pattern of time stamp intervals to avoid interference with the radio altimeter signal.

18 Claims, 4 Drawing Sheets

(56) References Cited

U.S. PATENT DOCUMENTS

| | | |
|---|---|---|
| 10,177,868 B2 | 1/2019 | Timm et al. |
| 10,383,130 B2 | 8/2019 | Rajendran et al. |
| 10,495,728 B2 | 12/2019 | Frick et al. |
| 10,693,580 B2 | 6/2020 | Timm et al. |
| 2017/0176588 A1 | 6/2017 | Franceschini et al. |
| 2017/0181146 A1* | 6/2017 | Franceschini ............ H04B 7/26 |

* cited by examiner

COORDINATION OF WIRELESS AVIONICS INTRA-COMMUNICATIONS (WAIC) WITH RADIO ALTIMETER SIGNALS

BACKGROUND

The present disclosure relates in general to wireless communications, and in particular to Wireless Avionics Intra-Communications (WAIC) reliability.

Modern aircraft typically transmit data between sensors and systems positioned about the aircraft using wired aircraft data buses, such as serial or other wired data buses. Using the data buses, data is routed between producing systems and consuming systems for operational control of the aircraft, such as for prognostics and health management, determination of air quality, detection of pathogens, or other operations of the aircraft.

Recently, to decrease the space, weight, and cost associated with wired aircraft data buses, wireless communication between aircraft systems and/or sensors has been considered. Radio Frequency spectrum in the frequency range 4200 MHz and 4400 MHz is specifically reserved for aircraft use. This spectrum is now allowed for Wireless Avionics Intra-Communications (WAIC) by the International Telecommunications Union (ITU) resolution 423 at the World Radio Council 2015. Primary allocation of the 4200 MHz-4400 MHz spectrum is for the Radio Altimeter (RA), a flight safety critical device that determines the altitude of the aircraft above ground.

Because of high power radio altimeter signals, WAIC communications can be affected by interference with radio altimeters. Accordingly, WAIC packets can be corrupted, resulting in errors in WAIC communications.

This issue is complicated by several factors. First, there are multiple radio altimeters on an aircraft. Second, an aircraft on the ground can be in the radio frequency range of radio altimeters of other aircraft. Third, radio altimeters transmit radio signals across the entire frequency range from 4200 MHz to 4400 MHz, making it impractical to simply divide the frequency spectrum so that radio altimeters use a sub-spectrum and WAIC communications use a different sub-spectrum. Fourth, many different types of aircraft have been using radio altimeters for years, meaning that it is impractical to modify the radio altimeters of legacy aircraft to co-exist with WAIC transmissions.

SUMMARY

In one example, a method for coordinating Wireless Avionics Intra-Communications (WAIC) communications with a radio altimeter signal includes monitoring a frequency band and recording a sequence of time stamps, each time stamp of the sequence of time stamps corresponding to a time at which a strength of the radio altimeter signal exceeds a threshold signal strength in the frequency band. The method further includes calculating time stamp intervals between successive time stamps to produce a sequence of time stamp intervals, and identifying a pattern of time stamp intervals in the sequence of time stamp intervals. The method further includes coordinating the WAIC communications with the pattern of time stamp intervals to avoid interference with the radio altimeter signal.

In another example, a system for coordinating WAIC communications with a radio altimeter signal includes a WAIC transceiver and a WAIC network controller. The WAIC network controller is configured to monitor a frequency band and record a sequence of time stamps, each time stamp of the sequence of time stamps corresponding to a time at which a strength of the radio altimeter signal exceeds a threshold signal strength in the frequency band. The WAIC network controller is further configured to calculate time stamp intervals between successive time stamps to produce a sequence of time stamp intervals, identify a pattern of time stamp intervals in the sequence of time stamp intervals, and coordinate the WAIC communications with the pattern of time stamp intervals to avoid interference with the radio altimeter signal.

DETAILED DESCRIPTION

Figure 1:
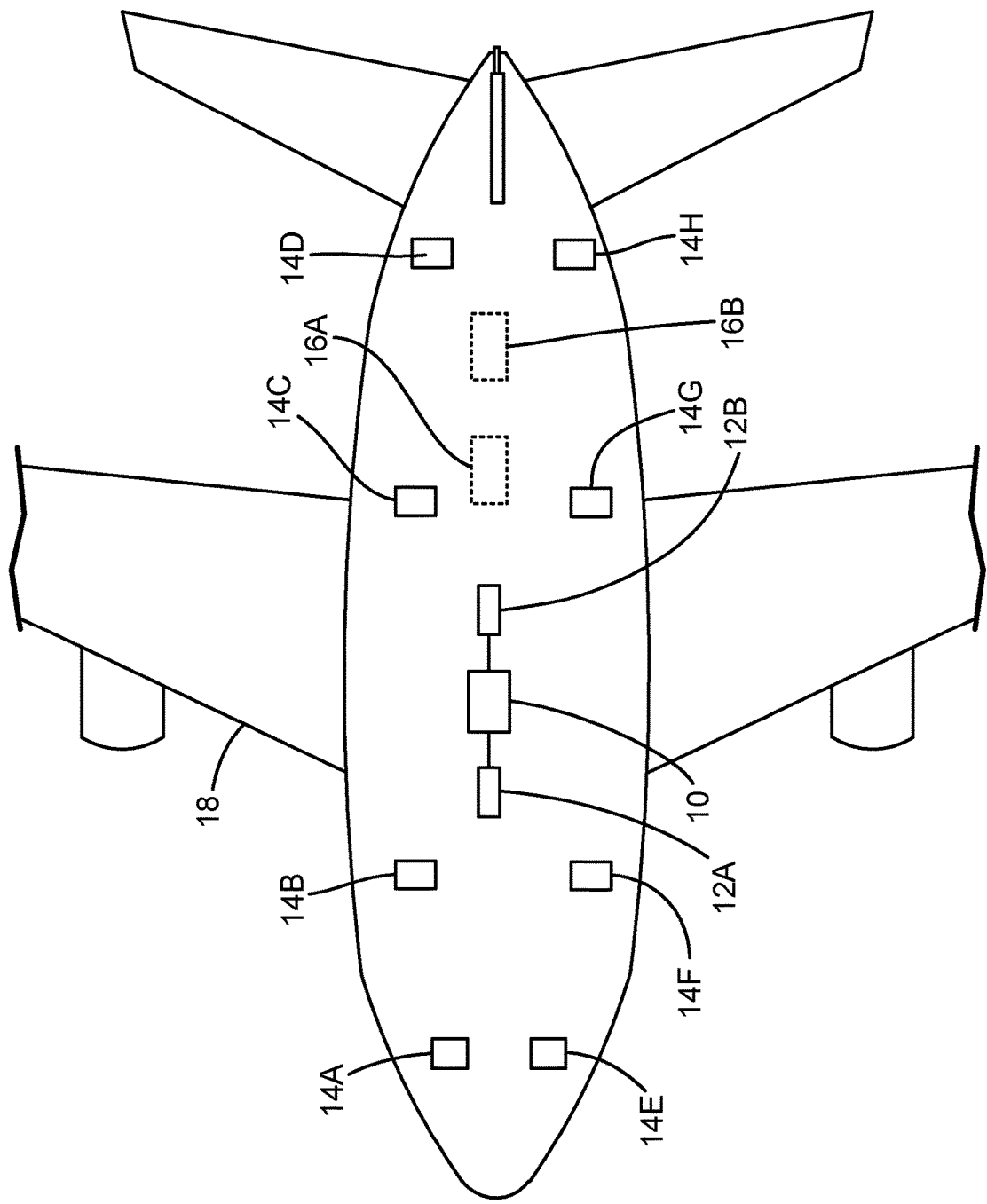
FIG. 1 is a schematic block diagram of an example aircraft that includes WAIC transceivers, WAIC routers, a WAIC network controller, and altimeters.

FIG. 1 is a schematic block diagram illustrating WAIC network controller 10, WAIC routers 12A and 12B, WAIC transceivers 14A, 14B, 14C, 14D, 14E, 14F, 14G, 14H, and radio altimeters 16A and 16B disposed on aircraft 18.

In the example of FIG. 1, WAIC network controller 10, which can be a general network controller configured for WAIC communications, is wired for communications with WAIC routers 12A and 12B. In the example of FIG. 1, WAIC routers 12A and 12B can communicate wirelessly with WAIC transceivers 14A-14H. WAIC transceivers 14A-14H can communicate with WAIC network controller 10 via WAIC routers 12A and 12B. Although illustrated as two WAIC routers 12A and 12B, it should be understood that any number of one or more WAIC routers can be used, such as one WAIC router, two WAIC routers, or three or more WAIC routers. Although illustrated as eight WAIC transceivers 14A-14H, it should be understood that any number of one or more WAIC transceivers can be used and located at various positions throughout aircraft 18, such as a single WAIC transceiver or any two or more WAIC transceivers. In the example of FIG. 1, radio altimeters 16A and 16B are located on the bottom of aircraft 18 to transmit radio signals toward the ground during flight and to determine an altitude of aircraft 18 based on returns of the transmitted signals. Although illustrated as two radio altimeters 16A and 16B located on the bottom of aircraft 18, it should be understood that any number of one or more radio altimeters can be used and located at various positions.

As is further described below, WAIC network controller 10 can use WAIC transceivers 14A-14H to identify patterns of time stamp intervals between time stamps corresponding to radio altimeter signals from radio altimeters 16A and 16B. WAIC network controller 10 can also be used, as described below, to coordinate WAIC communications with radio altimeter signals from radio altimeters 16A and 16B. WAIC network controller 10 can use WAIC routers 12A and 12B to send and receive data with WAIC transceivers 14A-14H. WAIC transceivers 14A-14H can be used, among other things, to monitor one or more frequency bands for radio altimeter signals, as described below.

Radio altimeters 16A and 16B are used to determine the altitude above ground level of aircraft 18. To find the altitude above ground level of aircraft 18, radio altimeters 16A and 16B emit radio signals and determine the altitude above ground based on returns of those signals. Because radio altimeters 16A and 16B are typically configured to emit signals in the 4200 MHz to 4400 MHz range (i.e., the frequency range also allocated for WAIC communications), the radio signals emitted by radio altimeters 16A and 16B can be detected by WAIC transceivers 14A-14H as, e.g., interference. However, such detections can be utilized in combination with WAIC network controller 10 to identify timing of the interference for use in coordinating the WAIC communications to avoid the interference.

For instance, as is further described below, WAIC communications can be coordinated to avoid radio altimeter signals emitted by radio altimeters 16A and 16B, thereby reducing interference and increasing WAIC communications reliability. Coordination of WAIC communications (e.g., using WAIC network controller 10), can be accomplished by adjusting the size of packets of WAIC communications and/or adjusting transmission timing of WAIC communications packets, so that WAIC communications take place in frequency bands during times that are not occupied by radio altimeter signals from radio altimeters 16A and 16B. For example, WAIC network controller 10 can use WAIC transceivers 14A-14H to monitor one or more frequency bands for radio altimeter signals, register a time stamp in response to sensing a radio altimeter signal strength greater than a threshold, and calculate a time stamp interval between time stamps. The time stamp interval corresponds to a time during which a frequency band is not occupied by a radio altimeter signal.

Accordingly, WAIC network controller 10 can coordinate WAIC communications to avoid radio altimeter signals from radio altimeters 16A and 16B, thereby reducing interference between WAIC communications and radio altimeter signals. WAIC network controller 10, implementing techniques of this disclosure, can therefore help to improve WAIC communications reliability.

Figure 2:
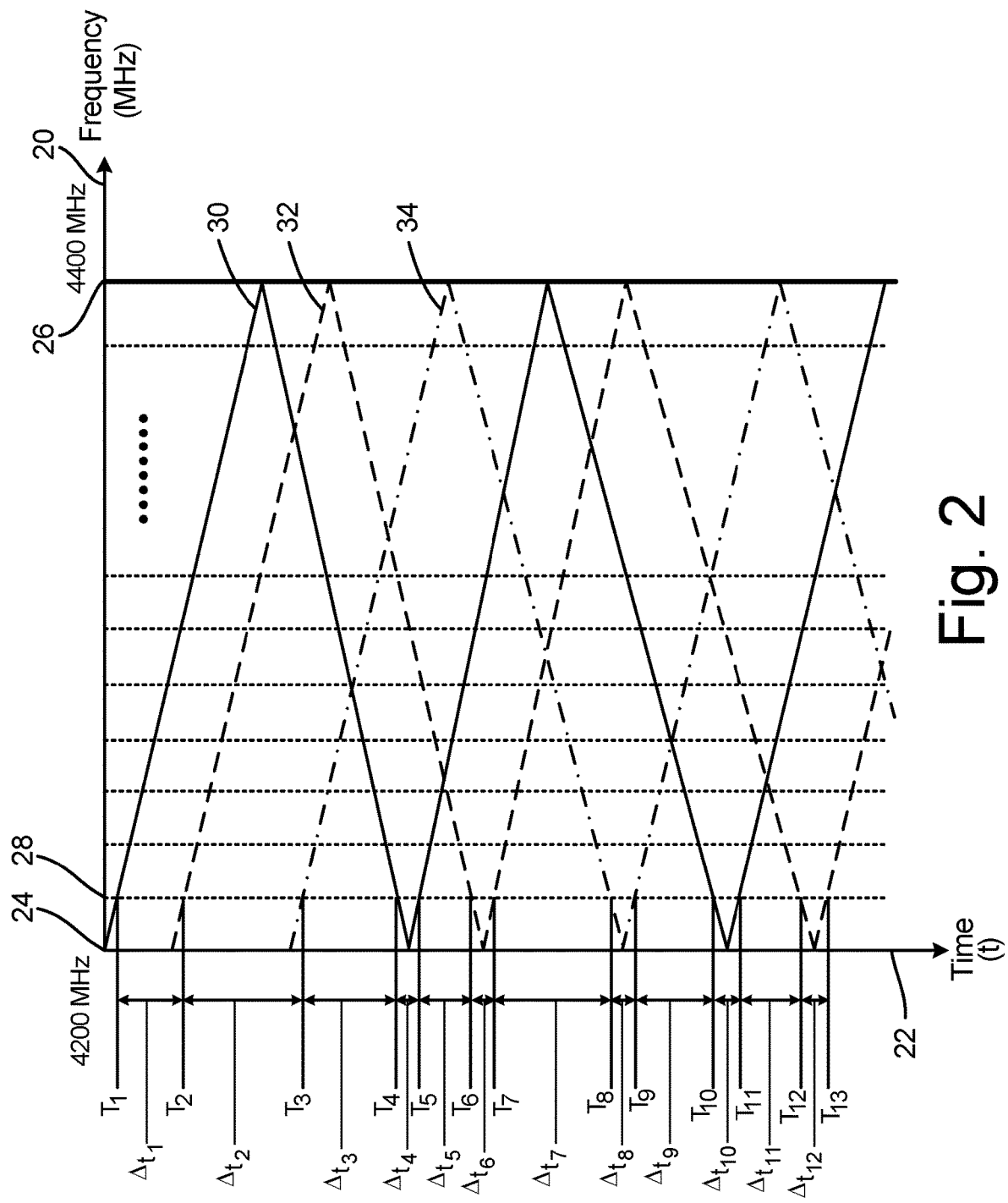
FIG. 2 is a graph illustrating example altimeter sweeps over a range of frequencies and time stamp intervals between time stamps representing interference from radio altimeter signals on a frequency channel.

FIG. 2 is a graph illustrating frequency axis 20 and time axis 22. FIG. 2 also illustrates minimum frequency 24, maximum frequency 26, frequency band 28, first altimeter sweep 30, second altimeter sweep 32, third altimeter sweep 34, time stamps $T_1$-$T_{13}$, and time stamp intervals $\Delta t_1$-$\Delta t_{12}$. First altimeter sweep 30, second altimeter sweep 32, and third altimeter sweep 34 are respectively represented by a line, a line with long dashes, and a line with a pattern of long dashes and dots.

In the example of FIG. 2, on frequency axis 20, frequency increases from left to right; time axis 22 illustrates passage of time from top to bottom. In the example of FIG. 2, minimum frequency 24 is 4200 megahertz (MHz), and maximum frequency 26 is 4400 MHz. In other examples, minimum frequency 24 can be a frequency that is different than 4200 MHz, and maximum frequency 26 can be a frequency that is different than 4400 MHz.

Frequency band 28 is an adjustable frequency range (e.g., adaptive) and can be a subset of the frequency range between minimum frequency 24 and maximum frequency 26. For purposes of clarity and ease of discussion, frequency band 28 is illustrated as a dotted line in the example of FIG. 2. As is further described below in the example of FIG. 3, frequency band 28 can be a bounded frequency range on frequency axis 20. Frequency band 28 can have, for example, a range of 10 MHz, 20 MHz, or another range. Moreover, frequency band 28 is only an example of what can be a plurality of frequency bands, each of which can be an adjustable frequency range that is a subset of the frequency range between minimum frequency 24 and maximum frequency 26. Accordingly, the entire frequency range between minimum frequency 24 and maximum frequency 26 can be divided into a plurality of frequency bands, each of which can have a range of, e.g., 10 MHz, 20 MHz, or another range.

A radio altimeter, (e.g., radio altimeters 16A and 16B of FIG. 1), emits a radio signal. In the present disclosure, the one or more radio signals from the one or more radio altimeters change frequency over time between minimum frequency 24 and maximum frequency 26. In the example of FIG. 2, there are three radio altimeters, each of which emits a corresponding radio signal. The change in frequency over time of the three radio altimeter signals is represented, respectively, by first altimeter sweep 30, second altimeter sweep 32, and third altimeter sweep 34. Although FIG. 2. illustrates three altimeter sweeps, it should be understood that there can be more or fewer than three altimeter sweeps corresponding to more or fewer than three radio altimeters.

In the example of FIG. 2, one or more WAIC transceivers, (e.g., WAIC transceivers 14A-14H of FIG. 1), have been configured by a WAIC network controller, (e.g., WAIC network controller 10 of FIG. 1), to monitor frequency band 28. The one or more WAIC transceivers monitor frequency band 28 for a radio altimeter signal with a signal strength that is greater than an adjustable threshold strength, such as a threshold signal strength of −30 decibel-milliwatts (dBm). As is further described below, a time stamp is recorded in response to the one or more WAIC transceivers sensing a radio altimeter signal with a strength greater than a threshold strength. In the example of FIG. 2., time stamp $T_1$ is recorded in response to sensing a radio altimeter signal corresponding to first altimeter sweep 30 that is greater than the threshold on frequency band 28. As is further described below in the example of FIG. 3, time stamp $T_1$ can also be described as comprising two time stamps: time stamp $T_{1i}$ and time stamp $T_{1o}$, which correspond, respectively, to the time at which the radio altimeter signal enters and exits frequency band 28.

Furthermore, in the example of FIG. 2., a sequence of time stamps $T_1$-$T_{13}$ is recorded. Each of time stamps $T_1$-$T_{13}$ is recorded in response to sensing the radio altimeter signal strength greater than the threshold on frequency band 28. As illustrated in FIG. 2, each of the time stamps in the sequence of time stamps $T_1$-$T_{13}$ can represent a time at which a radio signal corresponding to any one of first altimeter sweep 30, second altimeter sweep 32, or third altimeter sweep 34 is sensed on frequency band 28. So, regardless of the source of the radio altimeter signal, each time stamp of the sequence of time stamps $T_1$-$T_{13}$ corresponds to a time at which a radio altimeter signal is actively transmitting on frequency band 28.

As further described below, a WAIC network controller, (e.g., WAIC network controller 10 of FIG. 1) can calculate a time stamp interval between successive time stamps. The WAIC network controller can further be configured to calculate a plurality of time stamp intervals between successive time stamps in a sequence of time stamps, resulting in a sequence of time stamp intervals. In the example of FIG. 2, time stamp interval $\Delta t_1$ is calculated as the difference between time stamp $T_1$ and time stamp $T_2$. Time stamp interval $\Delta t_1$ therefore represents the amount of time between time stamp $T_1$ and time stamp $T_2$.

Furthermore, in the example of FIG. 2, time stamp intervals $\Delta t_1$-$\Delta t_{12}$ correspond to the differences between successive time stamps in time stamp sequence $T_1$-$T_{13}$. As such, time stamp intervals $\Delta t_1$-$\Delta t_{12}$ correspond to periods of time during which there is no radio altimeter signal with a strength above a threshold on frequency band 28. In other words, time stamp intervals $\Delta t_1$-$\Delta t_{12}$ represent times that WAIC communications can take place on frequency band 28 without radio altimeter signals with a strength above a threshold also using frequency band 28. Time stamps $T_1$-$T_{13}$ and time stamp intervals $\Delta t_1$-$\Delta t_{12}$ can, in this way, be used to avoid interference from radio altimeter signals on frequency band 28.

A WAIC network controller can also be configured, as further described below, to identify a pattern of time stamp intervals in a sequence of time stamp intervals. In the example of FIG. 2, a pattern of time stamp intervals in time stamp interval sequence $\Delta t_1$-$\Delta t_{12}$ can be identified. For instance, the WAIC network controller can identify the pattern of time stamp intervals as repeating sequences of intervals using, e.g., a depth-first or breadth-first search algorithm, a K-means clustering algorithm or another clustering algorithm, or other pattern recognition techniques. For instance, the WAIC network controller can identify a pattern of any two or more repeating time stamp intervals, such as two repeating time stamp intervals, three repeating time stamp intervals, or other numbers of repeating time stamp intervals.

In the example of FIG. 2, a pattern of time stamp intervals can be identified as a repetition of time stamp intervals $\Delta t_4$-$\Delta t_6$ and time stamp intervals $\Delta t_{10}$-$\Delta t_{12}$. As illustrated in FIG. 2, the pattern of time stamp intervals corresponds to a pattern of radio altimeter signals on frequency band 28. Accordingly, the WAIC network controller can identify a pattern of radio altimeter signals on frequency band 28 and identify a pattern of time stamp intervals corresponding to time between the radio altimeter signals. Furthermore, because radio altimeters are typically configured to vary (or sweep) frequencies at which they transmit the radio altimeter signal across the allocated frequency spectrum (e.g., 4200 MHz-4400 MHz) at a constant rate, the WAIC network controller can plan WAIC communications (e.g., coordinate WAIC communications) on frequency band 28 by anticipating the repetition of the time stamp intervals. For instance, the WAIC network controller can anticipate the pattern as occurring indefinitely or for a fixed amount of time, thereby avoiding interference with the radio altimeter signals on frequency band 28.

Figure 3:
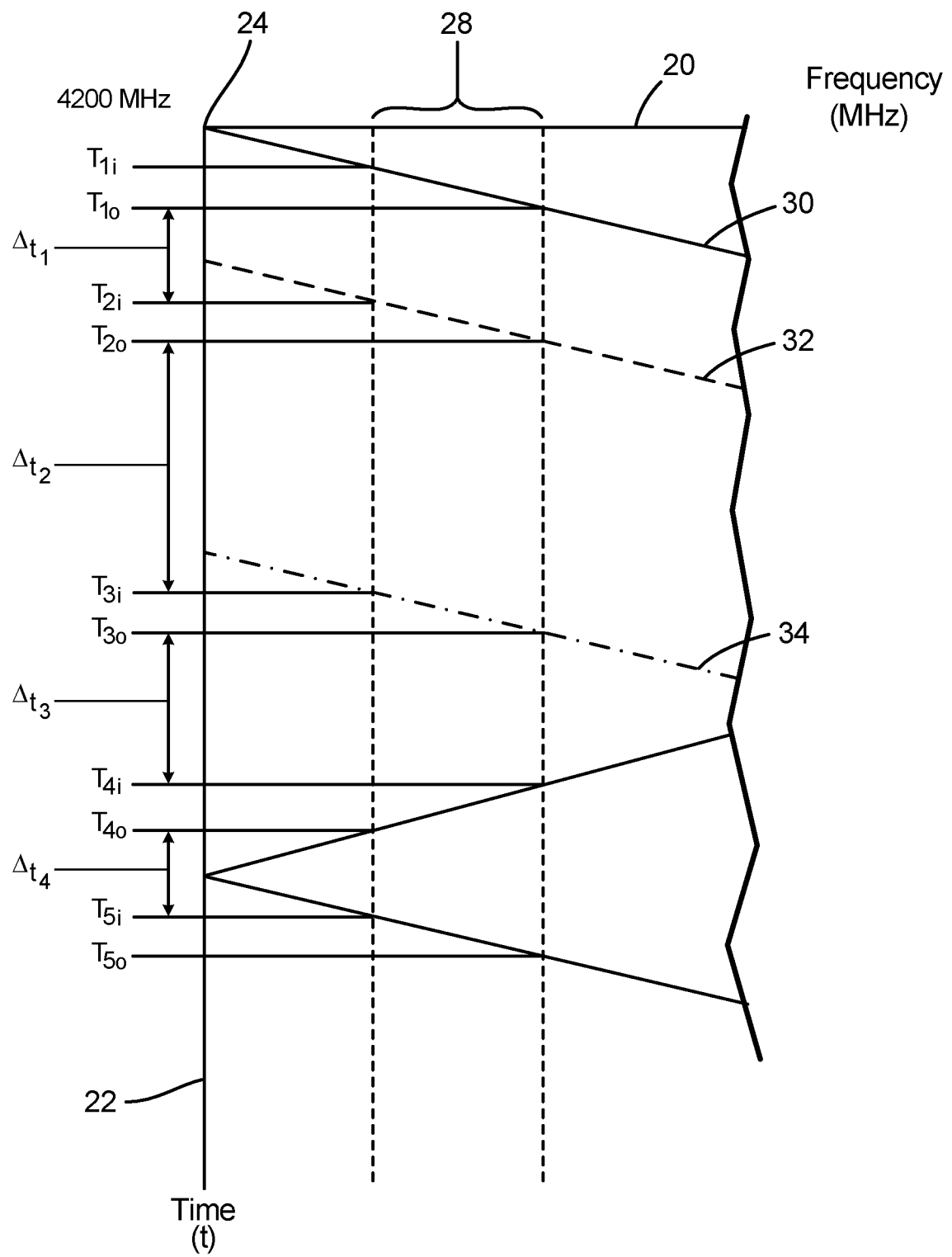
FIG. 3 is a graph illustrating a portion of the graph of FIG. 2 in further detail.

FIG. 3 is a graph illustrating a portion of the graph of FIG. 2 in further detail. The example of FIG. 3 provides a more detailed description of frequency band 28, time stamps $T_1$-$T_5$, and time stamp intervals $\Delta t_1$-$\Delta t_4$ of FIG. 2. For purposes of clarity and ease of discussion, the numbering of elements in the example of FIG. 3 is similar to the numbering of elements in the example of FIG. 2. Consequently, FIG. 3 illustrates frequency axis 20, time axis 22, minimum frequency 24, frequency band 28, first altimeter sweep 30, second altimeter sweep 32, third altimeter sweep 34, and time stamp intervals $\Delta t_1$-$\Delta t_4$.

Unlike the illustration of frequency band 28 in FIG. 2, frequency band 28 in FIG. 3 is illustrated as a frequency range on frequency axis 20. As such, it is illustrated as bounded by two dotted lines, which represent the minimum and maximum of frequency band 28. Frequency band 28 can have a range of, e.g., 10 MHz, 20 MHz, or any other range.

Another difference between the example of FIG. 2 and the example of FIG. 3 is the way that time stamps $T_1$-$T_5$ are represented. Take, for example, time stamp $T_1$. Like time stamp $T_1$, time stamp $T_{1i}$ and time stamp $T_{1o}$ correspond to a radio altimeter signal, with a strength greater than a threshold signal strength, corresponding to radio altimeter sweep 30. However, whereas time stamp $T_1$ in FIG. 2 generally corresponds to the time that the radio altimeter signal is sensed on frequency band 28, time stamp $T_{1i}$ and time stamp $T_{1o}$ correspond, respectively, to the time that the radio altimeter signal has a frequency equal to the minimum and maximum of frequency band 28. In other words, time stamp $T_{1i}$ corresponds to the time that the radio altimeter signal enters frequency band 28, and time stamp $T_{1o}$ corresponds to the time that the radio altimeters signal exits frequency band 28. In this way, time stamp $T_{1i}$ and time stamp $T_{1o}$ are a more detailed representation of time stamp $T_1$ of the example of FIG. 2.

Likewise, each of time stamps $T_2$-$T_5$ in the example of FIG. 2 are represented in more detail in the example of FIG. 3. Each of time stamps $T_2$-$T_5$ are represented as two time stamps: one that corresponds to a time that a radio altimeter sweep and a corresponding signal with a strength greater than a threshold enters frequency band 28; and another that corresponds to the time that the same radio altimeter sweep and corresponding signal exits frequency band 28.

Time stamp intervals $\Delta t_1$-$\Delta t_4$ in the example of FIG. 3 correspond to differences between successive time stamps in time stamp sequence $T_1$-$T_5$, where each time stamp in time stamp sequence $T_1$-$T_5$ is represented in more detail as comprising two time stamps. For example, time stamp interval $\Delta t_1$ in the example of FIG. 3 represents the difference between $T_{1o}$ and $T_{2i}$. In other words, time stamp interval $\Delta t_1$ corresponds to the time after which the radio altimeter signal corresponding to time stamp $T_1$ has exited frequency band 28, and before which the radio altimeter signal corresponding to time stamp $T_2$ has entered frequency band 28. As such, time stamp interval $\Delta t_1$ corresponds to a time that there is no radio altimeter signal with a strength above a threshold on frequency band 28.

Time stamp intervals $\Delta t_2$-$\Delta t_4$ in the example of FIG. 3 can likewise be determined. Each time stamp in the sequence of time stamps $T_1$-$T_5$ comprises two time stamps. As such, each time stamp interval in the sequence of time intervals $\Delta t_1$-$\Delta t_4$ represents the difference between a time stamp corresponding to a time that a radio altimeter signal exits the frequency band, and the following time stamp corresponding to a time that a radio altimeter signal enters the frequency band. It should be understood that determining the sequence of time stamp intervals in this way is not limited to the example of FIG. 3. As was described more generally in the example of FIG. 2 and as is further described below, determining a sequence of time stamp intervals for a frequency band can continue in this way until a pattern of time stamp intervals is identified.

Figure 4:
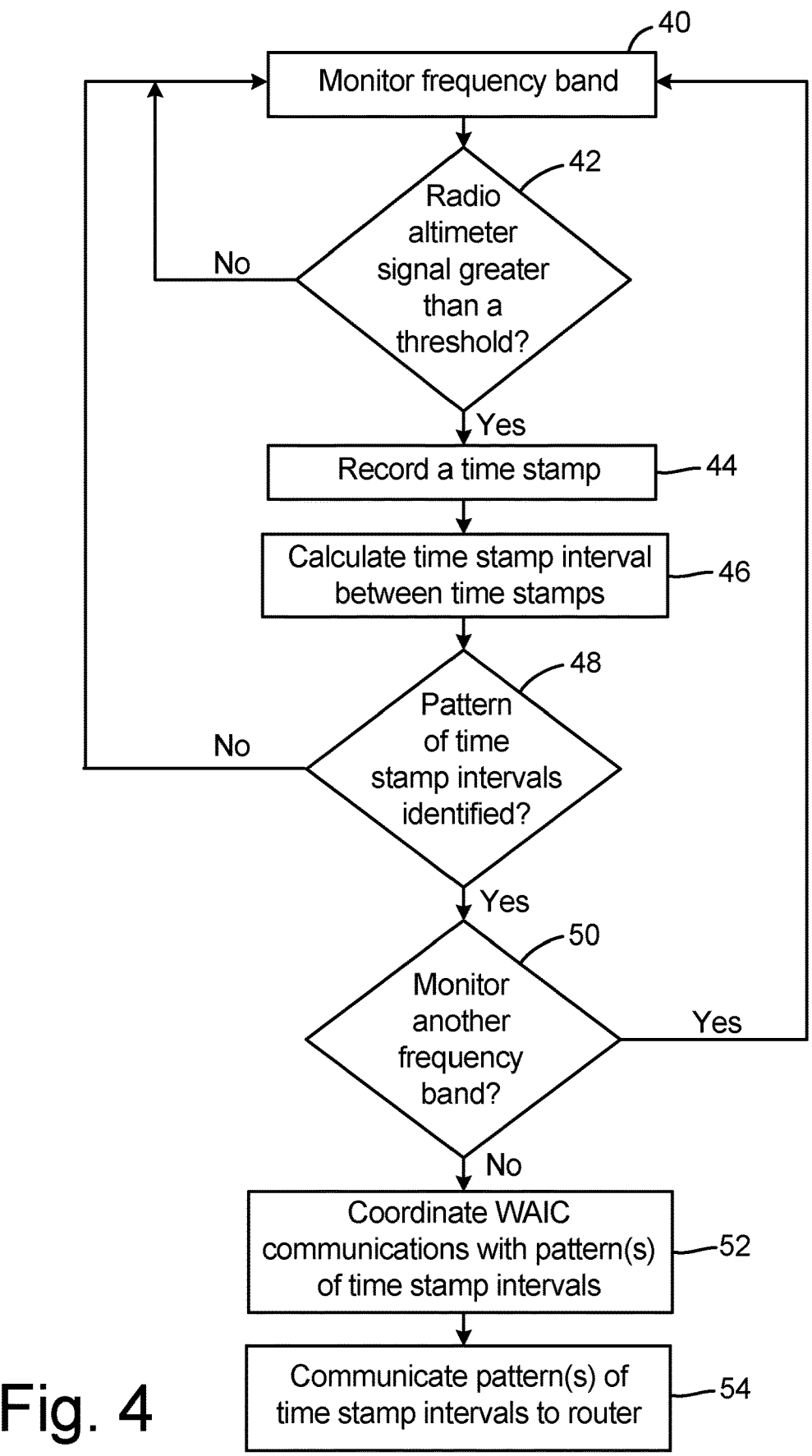
FIG. 4 is a flow diagram illustrating example operations for identifying a plurality of patterns of time stamp intervals.

FIG. 4 is a flow chart illustrating example operations for identifying a pattern of time stamp intervals. For purposes of clarity and ease of discussion, the example operations are described below within the context of the examples of FIGS. 1 and 2; however, it should be understood that the context of FIG. 2 also includes the more detailed description provided in the example of FIG. 3

As illustrated in FIG. 4, one or more WAIC transceivers are tuned by a WAIC network controller to monitor a frequency band between a minimum frequency and a maximum frequency (Step 40). For example, WAIC network controller 10 can tune one or more of WAIC transceivers 14A-14H to monitor frequency band 28, which is a sub-set of the WAIC frequencies (4200 MHz-4400 MHz).

It is determined whether a radio altimeter signal with a strength greater than a threshold is sensed on the frequency band that is being monitored (Step 42). For instance, WAIC network controller 10 can set a threshold signal strength of radio altimeter signals, and can determine whether a radio altimeter signal sensed by one or more WAIC transceivers is greater than the threshold signal strength. Depending on, among other considerations, the locations and specifications of the one or more WAIC transceivers, the locations and number of altimeters, the strength of altimeter signals, and the location of the aircraft, the threshold signal strength can vary. In response to determining that a radio altimeter signal with a strength greater than the threshold signal strength has not been sensed on the frequency band ("NO" branch of Step 42), the one or more WAIC transceivers continue to monitor the frequency band (Step 40).

In response to determining that a radio altimeter signal with a strength greater than the threshold signal strength has been sensed on the frequency band ("YES" branch of Step 42), a time stamp is recorded (Step 44). The time stamp corresponds to a time at which the radio altimeter signal with the strength greater than the threshold is sensed on the frequency band being monitored. As described in the example of FIG. 3, two time stamps can be recorded, one corresponding to the time at which the radio altimeter signal enters the frequency band and one corresponding to the time at which the radio altimeter signal exits the frequency band. The time stamps can, for example, be recorded by WAIC network controller 10, and can be stored in any way that is accessible to WAIC network controller 10 (e.g., in computer-readable memory of WAIC network controller 10). A plurality of recorded time stamps (e.g., time stamps $T_1$-$T_{13}$ of FIG. 2) defines a sequence of time stamps.

A time stamp interval is calculated between successive time stamps (Step 46). For example, WAIC network controller 10 can subtract from a time value of a given time stamp the time value of a sequentially-previous time stamp to determine the time stamp interval between the successive time stamps. In an instance where more than one time stamp interval for a frequency band has been calculated, (i.e., an instance in which three or more time stamps have been recorded for a frequency band) there can be a sequence of time stamp intervals, (e.g., time stamp intervals $\Delta t_1$-$\Delta t_{12}$ of FIG. 2).

It is determined whether there is a pattern of time stamp intervals in the sequence of time stamp intervals (Step 48). WAIC network controller 10 can, for example, analyze the sequence of time stamp intervals for a pattern using, e.g., a search algorithm (e.g., a depth-first search algorithm, a breadth-first search algorithm, or other search algorithm), a clustering algorithm (e.g., a K-means clustering algorithm or other clustering algorithm), or other pattern recognition techniques. In examples where no pattern of time stamp intervals is identified in the sequence of time stamp intervals ("NO" branch of Step 48), the one or more WAIC transceivers continue to monitor the frequency band (Step 40). In response to identifying a pattern of time stamp intervals in the sequence of time stamp intervals ("YES" branch of Step 48), the pattern of time stamp intervals can be stored (e.g., in computer-readable memory of WAIC network controller 10), and it is determined whether an additional frequency band is to be monitored (Step 50).

By monitoring an additional frequency band ("YES" branch of Step 50), Steps 40-48 are repeated using the new frequency band, starting at Step 40. By monitoring a plurality of additional frequency bands, i.e., taking the "YES" branch of Step 50 multiple times and iterating through Steps 40-48 multiple times, a plurality of patterns of time stamp intervals corresponding to a plurality of frequency bands can be identified. In some examples, (e.g., FIG. 2), the frequency range between minimum frequency 24 and maximum frequency 26 can be analyzed by repeating Steps 40-48 for a plurality of frequency bands. Each frequency band can be a subset of the frequency range from minimum frequency 24 to maximum frequency 26. Accordingly, repeating Steps 40-48 can result in a plurality of patterns of time stamp intervals corresponding to a plurality of frequency bands, which, together, can represent the entire frequency range from minimum frequency 24 to maximum frequency 26.

In other examples, a plurality of patterns of time stamp intervals corresponding to a plurality of frequency bands is calculated by extrapolating from one or more patterns of time stamp intervals identified at Step 48. This calculation can be done, for example, by using, among other factors, the minimum and maximum frequency of the radio altimeters signals that are being monitored, and by assuming that the number of radio altimeters is constant and the slope of the radio altimeter sweeps is constant. By doing this calculation, the frequencies of the radio altimeter signals over time, i.e., the radio altimeter sweeps, are known, and a plurality of patterns of time stamp intervals corresponding to a plurality of frequency bands can be identified.

In response to determining no additional frequency band is to be monitored ("NO" branch of Step 50), WAIC communications are coordinated with the one or more patterns of time stamp intervals in order to avoid interference with radio altimeter signals (Step 52). In one example, WAIC network controller 10 coordinates the WAIC communications to avoid the interference with the radio altimeter signals.

As an example, coordinating WAIC communications to avoid interference with the radio altimeter signals can include adjusting the size of one or more WAIC communication data packets. For instance, WAIC network controller 10 can adjust the size of the one or more WAIC communication packets such that transmission of the packets reliably occurs within time stamp intervals without occurring at times identified as corresponding to the pattern of radio altimeter signals.

As another example, coordinating the WAIC communications to avoid interference with the radio altimeter signals can include adjusting packet transmission timing of WAIC communications. For instance, WAIC network controller 10 can adjust transmission timing of one or more WAIC communications packets such that the packets are sent and received within time stamp intervals without occurring at times identified as corresponding to the pattern of radio altimeter signals.

As another example, coordinating the WAIC communications to avoid interference with the radio altimeter signals can include reordering packets based, at least in part, on packet size. For instance, WAIC network controller 10 can reorder packets depending on the size of the packets that are being reordered, so that packets are sent and received during time stamp intervals and thereby avoid interference with radio altimeter signals. For example, the transmission timing of a relatively small data packet and a relatively large data packet can be reordered so that transmission of the relatively small data packet can take place during a relatively small time stamp interval and the transmission of the relatively large data packet can take place during a relatively large time stamp interval.

As another example, coordinating the WAIC communications to avoid interference with the radio altimeter signals can include selecting a frequency band for WAIC communications. For instance, WAIC network controller 10 can select a pattern of time stamp intervals favorable to reliable WAIC communications and select the frequency band corresponding to that pattern of time stamp intervals. More specifically, WAIC network controller 10 can select a pattern of time stamp intervals, and the corresponding frequency band, in which there are, e.g., relatively large time stamp intervals, time stamp intervals with a relatively consistent size, or time stamp intervals that are in any other way favorable to coordinating WAIC communications with the radio altimeter signals.

As another example, coordinating the WAIC communications to avoid interference with radio altimeter signals can include changing the selected frequency band (i.e., the selected subset of frequencies) for WAIC communications. For instance, WAIC network controller 10 can change the frequency band for WAIC communications depending, at least in part, on the patterns of time stamp intervals corresponding to the frequency bands. In the case where WAIC communications is taking place on a frequency band with a corresponding pattern of time stamp intervals that are unfavorable to coordinating WAIC communications with radio altimeter signals, (e.g., time stamp intervals that are short and/or inconsistent), WAIC network controller 10 can change the frequency band for WAIC communications. WAIC network controller 10 can change WAIC communications to a frequency band with a corresponding pattern of time stamp intervals that is more favorable to reliable and efficient WAIC communications, e.g., a pattern with large, consistent, or in any other way favorable time stamp intervals. In this way, WAIC network controller 10 can, for example, change WAIC communications from one frequency band to another so that WAIC communications can, irrespective of the frequency band, take place during time stamp intervals without occurring at times corresponding to the pattern of radio altimeter signals.

In some examples, WAIC network controller 10 can monitor integrity of the WAIC communications and adjust the WAIC communications in response to identifying an error rate above a threshold error rate. Errors in WAIC communications can be detected e.g., by using an error detection method, such as by using a parity bit, a checksum, or a multi-bit cyclic redundancy check (CRC). A threshold for the error rate in WAIC communications can be, for example, a number of errors per unit time, a number of errors per number of packets, or any other measure of digital communications integrity. An increase in error rate can be caused by, among other reasons, the aircraft being in range of radio altimeters from other aircraft (e.g., when the aircraft is on or near the ground). In some examples, a detected increase in error rate (i.e., decrease in integrity) can be caused by a desynchronization of the WAIC communications with the one or more determined patterns of time stamp intervals.

In response to determining that WAIC communications error rate is above a threshold error rate, WAIC communications can be adjusted. WAIC communications can be adjusted by performing one or more of Steps 40-50. For example, a frequency band can be monitored for radio altimeter signals to update a pattern of time stamp intervals that correspond to times during which there is no interference from radio altimeter signals. This pattern of time stamp intervals can be compared, for example, with the previous pattern of time stamp intervals for that frequency band. The amount that WAIC communications are desynchronized with the pattern of time stamp intervals can then be identified, and WAIC communications can be adjusted accordingly. In another example, updating a pattern of time stamp intervals, by performing one or more of Steps 40-48, can be repeated for a plurality of frequency bands, resulting in a plurality of updated patterns of time stamp intervals. WAIC communications can therefore be coordinated with the updated plurality of patterns of time stamp intervals.

The one or more patterns of time stamp intervals are communicated to one or more WAIC routers (Step 54). The one or more WAIC routers, (e.g., WAIC routers 12A and 12B of FIG. 1), can be wired to, e.g., WAIC network controller 10, and the one or more WAIC routers can communicate wirelessly with the one or more WAIC transceivers (e.g., WAIC transceivers 14A-14H). The one or more WAIC routers can be used for communication between the WAIC network controller and the one or more WAIC transceivers. Accordingly, by communicating the one or more patterns of time stamp intervals to the one or more routers, the WAIC network controller can coordinate WAIC communications, which include the one or more WAIC transceivers, with the one or more patterns of time stamp intervals.

Accordingly, techniques of this disclosure enable coordinating WAIC communications with patterns of time stamp intervals that correspond to times on frequency bands during which there is no interference from radio altimeter signals with a strength above a threshold strength. By coordinating WAIC communications to avoid interference with radio altimeter signals, WAIC communications reliability is improved and WAIC communications devices can be better integrated with aircrafts that use radio altimeters.

Discussion of Possible Embodiments

The following are non-exclusive descriptions of possible embodiments of the present invention.

A method for coordinating Wireless Avionics Intra-Communications (WAIC) communications with a radio altimeter signal includes monitoring a frequency band and recording a sequence of time stamps, each time stamp of the sequence of time stamps corresponding to a time at which a strength of the radio altimeter signal exceeds a threshold signal strength in the frequency band. The method further includes calculating time stamp intervals between successive time stamps to produce a sequence of time stamp intervals, and identifying a pattern of time stamp intervals in the sequence of time stamp intervals. The method further includes coordinating the WAIC communications with the pattern of time stamp intervals to avoid interference with the radio altimeter signal.

The method of the preceding paragraph can optionally include, additionally and/or alternatively, any one or more of the following features, configurations, operations, and/or additional components:

Coordinating the WAIC communications with the pattern of time stamp intervals can include communicating the pattern of time stamp intervals to a WAIC router.

The method can further include monitoring integrity of the WAIC communications, and adjusting the WAIC communications in response to determining that the integrity of the WAIC communications does not satisfy threshold integrity criteria.

Adjusting the WAIC communications in response to determining that the integrity of the WAIC communications does not satisfy threshold integrity criteria can include: monitoring the frequency band; recording an updated sequence of time stamps, each time stamp of the updated sequence of time stamps corresponding to a time at which the strength of the radio altimeter signal exceeds the threshold signal strength in the frequency band; calculating an updated plurality of time stamp intervals between successive time stamps in the updated sequence of time stamps; communicating the updated pattern of time stamp intervals to the WAIC router; and coordinating the WAIC communications with the updated pattern of time stamp intervals.

The frequency band can be an adaptive in the range between 4200 MHz to 4400 MHz.

Identifying the pattern of time stamp intervals in the plurality of time stamp intervals can include using three or more consecutive time stamp intervals.

The method can further include identifying a plurality of patterns of time stamp intervals corresponding to a plurality of frequency bands.

The method can further include calculating, by extrapolating from the pattern of time stamp intervals, a plurality of patterns of time stamp intervals corresponding to a plurality of frequency bands.

Coordinating the WAIC communications with the pattern of time stamp intervals to avoid the interference with the altimeter signal can include one or more of: adjusting a packet size of the WAIC communications; and adjusting packet transmission timing of the WAIC communications.

Coordinating the WAIC communications with the pattern of time stamp intervals to avoid the interference with the altimeter signal can further include selecting the frequency band for the WAIC communications.

A system for coordinating WAIC communications with a radio altimeter signal includes a WAIC transceiver and a WAIC network controller. The WAIC network controller is configured to: monitor a frequency band; record a sequence of time stamps, each time stamp of the sequence of time stamps corresponding to a time at which a strength of the radio altimeter signal exceeds a threshold signal strength in the frequency band; calculate time stamp intervals between successive time stamps to produce a sequence of time stamp intervals; identify a pattern of time stamp intervals in the sequence of time stamp intervals; and coordinate the WAIC communications with the pattern of time stamp intervals to avoid interference with the radio altimeter signal.

The system of the preceding paragraph can optionally include, additionally and/or alternatively, any one or more of the following features, configurations, operations, and/or additional components:

The WAIC network controller can be configured to coordinate the WAIC communications with the pattern of time stamp intervals by communicating the pattern of time stamp intervals to a WAIC router.

The WAIC network controller can be configured to monitor the integrity of the WAIC communications, and adjust the WAIC communications in response to determining that the integrity of the WAIC communications does not satisfy threshold integrity criteria.

The WAIC network controller can be configured to adjust the WAIC communications in response to determining that the integrity of the WAIC communications does not satisfy threshold integrity criteria by being configured to: monitor a frequency band; record an updated sequence of time stamps, each time stamp of the updated sequence of time stamps corresponding to a time at which a strength of the radio altimeter signal exceeds a threshold signal strength in the frequency band; calculate updated time stamp intervals between successive time stamps to produce an updated sequence of time stamp intervals; identify an updated pattern of time stamp intervals in the sequence of time stamp intervals; and coordinate the WAIC communications with the updated pattern of time stamp intervals to avoid interference with the radio altimeter signal.

The frequency band can be an adjustable range between 4200 MHz and 4400 MHz.

The WAIC network controller can be configured to identify a pattern of time stamp intervals in the plurality of time stamp intervals by using three or more successive time stamp intervals.

The WAIC network controller can be configured to identify a plurality of patterns of time stamp intervals corresponding to a plurality of frequency bands.

The WAIC network controller can be configured to calculate, by extrapolating from a pattern of time stamp intervals, a plurality of patterns of time stamp intervals corresponding to a plurality of frequency bands.

The WAIC network controller can be configured to coordinate the WAIC communications with the pattern of time stamp intervals to avoid the interference with the altimeter signal further by being configured to adjust one or more of: a packet size of the WAIC communications; and packet transmission timing of the WAIC communications.

The WAIC network controller can be configured to coordinate the WAIC communications with the pattern of time stamp intervals to avoid the interference with the altimeter signal by selecting the frequency band for the WAIC communications.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for coordinating Wireless Avionics Intra-Communications (WAIC) communications with a radio altimeter signal, the method comprising:
   monitoring a frequency band;
   recording a sequence of time stamps, each time stamp of the sequence of time stamps corresponding to a time at which a strength of the radio altimeter signal exceeds a threshold signal strength in the frequency band;
   calculating time stamp intervals between successive time stamps to produce a sequence of time stamp intervals;
   identifying a pattern of time stamp intervals in the sequence of time stamp intervals; and
   coordinating the WAIC communications with the pattern of time stamp intervals to avoid interference with the radio altimeter signal;
   wherein coordinating the WAIC communications with the pattern of time stamp intervals to avoid the interference with the altimeter signal further comprises one or more of: adjusting a packet size of the WAIC communications; and adjusting packet transmission timing of the WAIC communications.

2. The method of claim 1,
   wherein coordinating the WAIC communications with the pattern of time stamp intervals comprises communicating the pattern of time stamp intervals to a WAIC router.

3. The method of claim 1, further comprising:
   monitoring integrity of the WAIC communications; and adjusting the WAIC communications in response to determining that the integrity of the WAIC communications does not satisfy threshold integrity criteria.

4. The method of claim 3,
wherein adjusting the WAIC communications in response to determining that the integrity of the WAIC communications does not satisfy the threshold integrity criteria comprises:
monitoring the frequency band;
recording an updated sequence of time stamps, each time stamp of the updated sequence of time stamps corresponding to a time at which the strength of the radio altimeter signal exceeds the threshold signal strength in the frequency band;
calculating an updated plurality of time stamp intervals between successive time stamps in the updated sequence of time stamps;
communicating the updated pattern of time stamp intervals to the WAIC router; and
coordinating the WAIC communications with the updated pattern of time stamp intervals.

5. The method of claim 1,
wherein the frequency band is adaptive between 4200 MHz and 4400 MHz.

6. The method of claim 1,
wherein identifying the pattern of time stamp intervals in the plurality of time stamp intervals further comprises using three or more consecutive time stamp intervals.

7. The method of claim 1, further comprising:
calculating, by extrapolating from the pattern of time stamp intervals, a plurality of patterns of time stamp intervals corresponding to a plurality of frequency bands.

8. The method of claim 1, further comprising:
identifying a plurality of patterns of time stamp intervals corresponding to a plurality of frequency bands.

9. The method of claim 1,
wherein coordinating the WAIC communications with the pattern of time stamp intervals to avoid the interference with the altimeter signal further comprises selecting the frequency band for the WAIC communications.

10. A system for coordinating Wireless Avionics Intra-Communications (WAIC) communications with a radio altimeter signal, the system comprising:
a WAIC transceiver; and
a WAIC network controller configured to:
monitor a frequency band;
record a sequence of time stamps, each time stamp of the sequence of time stamps corresponding to a time at which a strength of the radio altimeter signal exceeds a threshold signal strength in the frequency band;
calculate time stamp intervals between successive time stamps to produce a sequence of time stamp intervals;
identify a pattern of time stamp intervals in the sequence of time stamp intervals; and
coordinate the WAIC communications with the pattern of time stamp intervals to avoid interference with the radio altimeter signal;
wherein the WAIC network controller is configured to coordinate the WAIC communications with the pattern of time stamp intervals to avoid the interference with the altimeter signal further by being configured to adjust one or more of: a packet size of the WAIC communications; and packet transmission timing of the WAIC communications.

11. The system of claim 10,
wherein the WAIC network controller is configured to coordinate the WAIC communications with the pattern of time stamp intervals by communicating the pattern of time stamp intervals to a WAIC router.

12. The system of claim 10,
wherein the WAIC network controller is further configured to:
monitor the integrity of the WAIC communications; and
adjust the WAIC communications in response to determining that the integrity of the WAIC communications does not satisfy threshold integrity criteria.

13. The system of claim 12,
wherein the WAIC network controller is configured to adjust the WAIC communications in response to determining that the integrity of the WAIC communications does not satisfy threshold integrity criteria by being configured to:
monitor the frequency band;
record an updated sequence of time stamps, each time stamp of the updated sequence of time stamps corresponding to a time at which the strength of the radio altimeter signal exceeds the threshold signal strength in the frequency band;
calculate an updated plurality of time stamp intervals between successive time stamps in the updated sequence of time stamps
communicate the updated pattern of time stamp intervals to the WAIC router; and
coordinate the WAIC communications with the updated pattern of time stamp intervals.

14. The system of claim 10,
wherein the frequency band is an adjustable range between 4200 MHz and 4400 MHz.

15. The system of claim 10,
wherein the WAIC network controller is configured to identify a pattern of time stamp intervals in the plurality of time stamp intervals by using three or more successive time stamp intervals.

16. The system of claim 10,
wherein the WAIC network controller is further configured to identify a plurality of patterns of time stamp intervals corresponding to a plurality of frequency bands.

17. The system of claim 10,
wherein the WAIC network controller is further configured to calculate, by extrapolating from a pattern of time stamp intervals, a plurality of patterns of time stamp intervals corresponding to a plurality of frequency bands.

18. The system of claim 10,
wherein the WAIC network controller is configured to coordinate the WAIC communications with the pattern of time stamp intervals to avoid the interference with the altimeter signal by selecting the frequency band for the WAIC communications.

* * * * *